US009514450B2

(12) United States Patent
Soares Pi Farias

(10) Patent No.: US 9,514,450 B2
(45) Date of Patent: Dec. 6, 2016

(54) SYSTEM FOR ACCESSING A POS TERMINAL, METHOD FOR DOWNLOADING AND UPDATING APPLICATIONS AND METHOD FOR PERFORMING ELECTRONIC OPERATION USING SUCH A SYSTEM

(71) Applicant: APPI TECNOLOGIA S.A., Rio de Janeiro (BR)

(72) Inventor: Alexandre Soares Pi Farias, Rio de Janeiro (BR)

(73) Assignee: APPI Technologia S.A., Rio de Janeiro (BR)

( * ) Notice: Subject to any disclaimer, the term of this patent is extended or adjusted under 35 U.S.C. 154(b) by 0 days.

(21) Appl. No.: 14/813,639

(22) Filed: Jul. 30, 2015

(65) Prior Publication Data

US 2015/0339649 A1    Nov. 26, 2015

Related U.S. Application Data

(63) Continuation of application No. 11/597,767, filed as application No. PCT/BR2005/000094 on May 25, 2005, now Pat. No. 9,131,012.

(Continued)

(51) Int. Cl.
*G06Q 30/00* (2012.01)
*G06Q 20/20* (2012.01)
(Continued)

(52) U.S. Cl.
CPC ............... *G06Q 20/202* (2013.01); *G06F 8/65* (2013.01); *G06Q 20/20* (2013.01); *G07G 1/14* (2013.01);
(Continued)

(58) Field of Classification Search
CPC ....... H04K 5/0001; H04K 19/00; H04K 29/00
(Continued)

(56) References Cited

U.S. PATENT DOCUMENTS 6,606,744 B1 *  8/2003  Mikurak ................. H04L 29/06
                                                        717/174
6,658,497 B1   12/2003  Kawasaki et al.
(Continued)

FOREIGN PATENT DOCUMENTS

CN    1378670 A      11/2002
EP    0 996 067 A2    4/2000
(Continued)

OTHER PUBLICATIONS

Nathan J. Muller; *Focus on Open View a Guide to Hewlett-Packard's Network and Systems Management Platform*; pp. 179-185.
(Continued)

*Primary Examiner* — Rokib Masud
(74) *Attorney, Agent, or Firm* — Alston & Bird LLP

(57) ABSTRACT

The present invention refers to system for accessing POS terminals (10), with or without pin pad, using a client system (15) to connect such POS terminal (10) to a network comprised by at least one server (30), the system enabling any POS terminal (10) to execute applications (25) located in such servers, through a plurality of specific protocols (20) in a process similar to the Internet, as well to download and update applications from application servers (30) and to perform electronic operations in transaction serves (35).

22 Claims, 7 Drawing Sheets

Related U.S. Application Data

(60) Provisional application No. 60/574,134, filed on May 25, 2004.

(51) Int. Cl.
*H04L 29/06* (2006.01)
*G06F 9/445* (2006.01)
*G07G 1/14* (2006.01)
*H04L 29/08* (2006.01)

(52) U.S. Cl.
CPC ............... *H04L 67/02* (2013.01); *H04L 67/34* (2013.01); *H04L 67/42* (2013.01)

(58) Field of Classification Search
USPC ....... 455/456.1, 39; 717/174; 705/26.41, 27, 705/431
See application file for complete search history.

(56) References Cited

U.S. PATENT DOCUMENTS

| | | | |
|---|---|---|---|
| 7,363,654 B1* | 4/2008 | Yamada | G06F 17/3056 707/E17.005 |
| 2002/0046185 A1 | 4/2002 | Villart et al. | |
| 2003/0120593 A1 | 6/2003 | Bansal et al. | |
| 2005/0197115 A1* | 9/2005 | Clark et al. | B23K 9/0953 455/426.1 |
| 2006/0041635 A1* | 2/2006 | Alexander | H04L 29/12009 709/218 |

FOREIGN PATENT DOCUMENTS

| | | |
|---|---|---|
| EP | 1 223 517 A1 | 7/2002 |
| JP | H05243303 A | 9/1993 |
| JP | 2000-132493 A | 5/2000 |
| JP | 2002-215429 A | 8/2002 |
| JP | 2002-251674 A | 9/2002 |
| JP | 2002-543479 A | 12/2002 |
| WO | WO 00/41145 A1 | 7/2000 |
| WO | WO 01/65427 A1 | 9/2001 |
| WO | WO 02/13487 A2 | 2/2002 |
| WO | WO 03/028389 A1 | 4/2003 |

OTHER PUBLICATIONS

International Search Report for PCT Application No. PCT/BR2005/000094; Filed May 25, 2005; Date of Completion Nov. 11, 2006; Date of Mailing Dec. 27, 2006.

Written Opinion for PCT Application No. PCT/BR2005/000094; Filed May 25, 2005.

Supplementary European Search Report for Application No. EP 05 74 6722 dated Jul. 29, 2013.

International Preliminary Report on Patentability for Application No. PCT/BR205/000094 dated Jan. 30, 2007.

Yorimoto, Y., *JICSAP Special Report JICSAP Specification for Realization of IC Card and Multipurpose Utilization?* (4), CardWave, Japan, Seamedia Co., Ltd., vol. 11, No. 7 (Jun. 10, 1998) pp. 52-54.

* cited by examiner

SYSTEM FOR ACCESSING A POS TERMINAL, METHOD FOR DOWNLOADING AND UPDATING APPLICATIONS AND METHOD FOR PERFORMING ELECTRONIC OPERATION USING SUCH A SYSTEM

CROSS-REFERENCE TO RELATED APPLICATIONS

This application is a continuation of U.S. application Ser. No. 11/597,767, filed Jul. 15, 2008, entitled "SYSTEM FOR ACCESSING A POS TERMINAL, METHOD FOR DOWNLOADING AND UPDATING APPLICATIONS AND METHOD FOR PERFORMING ELECTRONIC OPERATION USING SUCH A SYSTEM", which claims the benefit of priority from and is a national phase entry of PCT/BR2005/000094, filed May 25, 2005, entitled "System For Accessing A POS Terminal, Method For Downloading And Updating Applications And Method For Performing Electronic Operation Using Such A System", which claims the benefit of priority from U.S. Ser. No. 60/574,134, filed May 25, 2004, entitled "System And Method For Developing And Deploying Applications In Countertop And Portable Transaction Devices Using Markup Languages", all of which are incorporated herein by reference in their entirety.

FIELD OF THE INVENTION

The present invention relates to a system for accessing POS and pin pad devices using a client system connected by a network to at least one server as well as to a method for updating and downloading application and performing a plurality of operations using said system.

DESCRIPTION OF THE PRIOR ART

Many companies in the industry of electronic operations (healthcare insurance, loyalty, pre paid reload, gift card, etc.) are constantly seeking for solutions to improve their services and offer new ones, becoming more competitive.

Prior to the advent of the present invention, the users, also known as acquirers, had been provided with technologically limited terminals.

Regarding portability, each Point-of-Sale terminal, herein called POS terminal, comprised only their proprietary hardware and operating system. Accordingly, applications needed to be rewritten and adapted for each terminal model, in a laborious and expensive process. Application sharing was also insufficient since POS terminals used in the network were able only to send and receive transaction data, without taking advantage of other network facilities such as application servers. Also, since applications were hard-coded into the POS terminals (fat client), it was extremely difficult, may-be impossible, to use different applications on the same machine due to memory and development restrictions.

In this way, each POS terminal used to be independently updated in a non-automated process. Lately, heterogeneous environments and remote upgrading systems provided by manufacturers of POS terminals used to be applied in upgrading processes. However, such terminals and their respective upgrading systems were not compatible with each other, requiring specific knowledge and maintenance staff for each system and each vendor, thus replicating efforts and costs.

Another problem existing in the prior art was the necessity of having advanced programming skills as well as a deep knowledge of the proprietary operating environment of each terminal manufacturer on the market, regarding its specificity. It resulted in a huge amount of costs in training staffs, application development and maintenance, and consequently, it limited the scope of available POS services and applications.

OBJECTIVE OF THE INVENTION

In view of the drawback above indicated, the invention provides a system for accessing POS devices transforming POS networks into service networks and reducing costs in implementing and managing such POS networks.

Another objective of the present invention is to provide a system which features more portability to applications in different models of POS terminals as well as allows sharing of multiple applications in the same POS device.

A further objective of the present invention is to provide a system for accessing devices that enable users to execute an application in POS terminal made by different vendors with no need for customization.

An important aspect of the invention is that the system is engineered to complement the use of standard POS terminals, not to compete with them since many companies, as VeriFone, Ingenico, Lipman, Sagem, Axalto and Intellect among others, have already developed such POS terminal a long time ago.

SUMMARY OF THE INVENTION

The invention refers to a client system for accessing POS and pin pad devices, connecting such POS terminal to a network comprised by at least one server. The system enables any POS terminal to execute applications located in application servers connected to the POS network using TCP/IP (Internet, Intranets, VPNs, etc.) and, WML (Wireless Markup Language) pages and scripts, in a process similar to the Internet.

The client system technology implements a thin-client model for the client/server architecture. It assumes that the client has direct access to the server, where all business logic remains. This assumption intrinsically offers two major advantages to software development and maintenance. Application development occurs entirely at the server side where many high productivity tools are available and client side application can be automatically upgraded immediately after a server side update.

WAP standard, aiming at first generation cell phones, is concerned with communication penalties between the client and the server. Therefore, WAP forum has specified some information persistence and data validation mechanisms that dramatically reduce the amount of information exchanged through the network during successive WML (Wireless Markup Language) pages transition. Unchanged screen page requests may also be avoided with HTTP or WSP Web protocols cache mechanisms, although still relying on a client-driven updating process. Hence, together with WMLScript data validation routines, WML browsing almost resembles a POS application flow of screens.

WML is a declarative markup language targeted to create data entry screens. It offers basic input typing facilities and basic choice selection. It has a volatile variable environment meant to store information among screens of the same transaction flow. WMLScript is a tiny scripting language designed to simple data validation script writing. Neither WML nor WMLScript provide any persistent data storage neither assumes the presence of any particular peripheral device.

By analogy, the client system concept was brought to POS terminals. Particularly, WML browsers have shown to be the closest standard that would offer to a POS terminal the web and browsing benefits even still lacking some key features required by electronic operations, such as receipt printing and transaction history storage, among others.

POS terminals used to have peripherals, like magnetic card reader, thermal printer, pin pad entry device, smart card readers and other serial devices that are commonly integrated through a standard RS-232 interface such as a bar code reader, a Mifare contact-less card reader and/or a check reader. Besides peripheral device access, POS applications demand some features not available on standard WML and WMLScript definitions such as persistent data record store, ISO8583 message formatting, classified information cryptography, and enhanced data entry support, EMV transaction authorization and, for dial up terminals, SDLC and X.28 legacy network support. Moreover, a server driven cache update policy was required in order to fit current transaction servers upgrading mechanisms.

As it will be described in the present invention, the client system technology allows the use of the POS terminal as a "low cost" platform for multiple applications sharing and value added services, turning a POS network into a "de facto" service network.

DETAILED DESCRIPTION OF THE INVENTION

Figure 1:
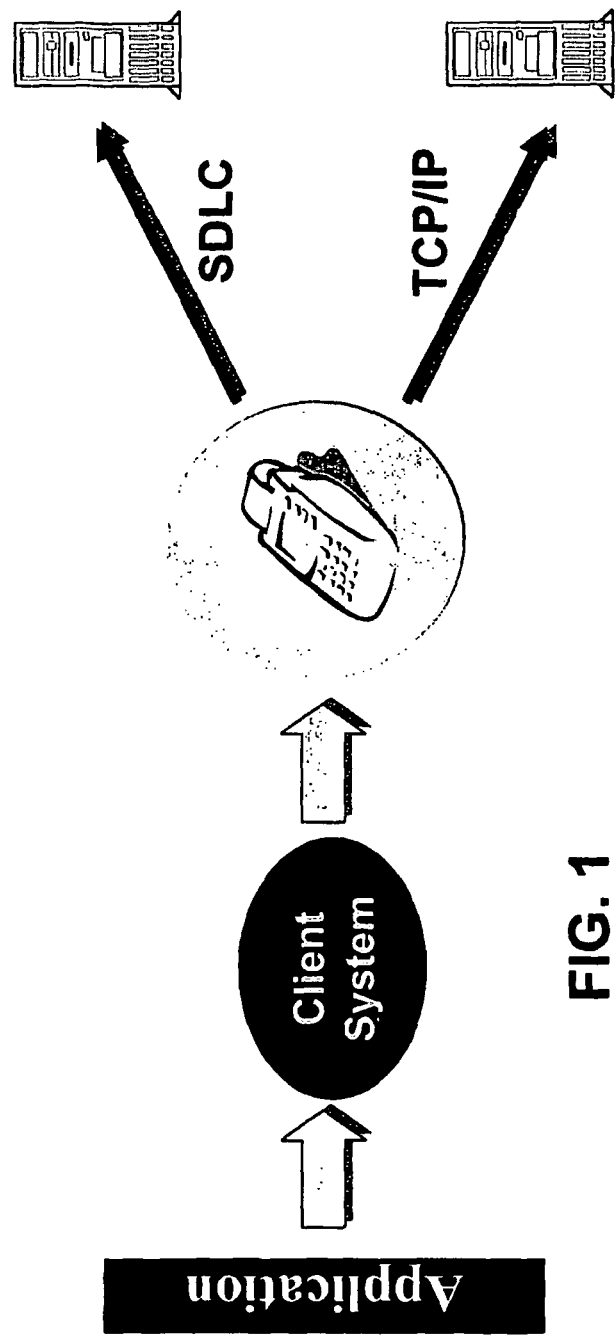
FIG. 1 depicts a POS terminal connected to multiple networks via different communication protocols.

The present invention consists of a system for accessing and connecting customized POS terminals 10 to any network, using a specific client system 15. When in operation, the client system 15 assumes the control of all resources of the POS terminals 10 acting as an operational system. It enables any POS terminal 10 to execute applications 25 located in application servers 30 connected to the POS network using TCP/IP (Internet, Intranets, VPNs, etc.) and WML (Wireless Markup Language) pages and scripts in a process similar to the Internet. The client system 15 also enable the same application 25 to use multiple communication protocols 20 when connected to distinct access networks, thus making it possible the use of TCP/IP, legacy networks (SDLC and X.28, for example) and others (GSM, GPRS, CDMA, Ethernet, Wi-Fi, Bluetooth, IR, etc) as shown in FIG. 1. Further, the client system 15 also has an advanced caching feature with the purpose of increasing data-exchange speed, allowing even true offline operations. The client system 15 still recognizes and controls all of the input and output devices connected to the POS, such as magnetic card readers, smart card readers, printers, pin pads, bar code readers, check readers, keyboards, Mifare contact-less card reader and so forth.

The access to application servers 30 provided by the present invention makes it possible to bring to the POS network all of the flexibility and functionalities available on the Internet on what concerns services and applications. As a result, it reduces the maintenance costs and adds flexibility to the process of applications upgrading. Moreover, because of the possibility of using distinct physical networks, the application upgrading process does not compromise the average data exchange time, which use legacy networks based on SDLC or other asynchronous protocols.

Figure 2:
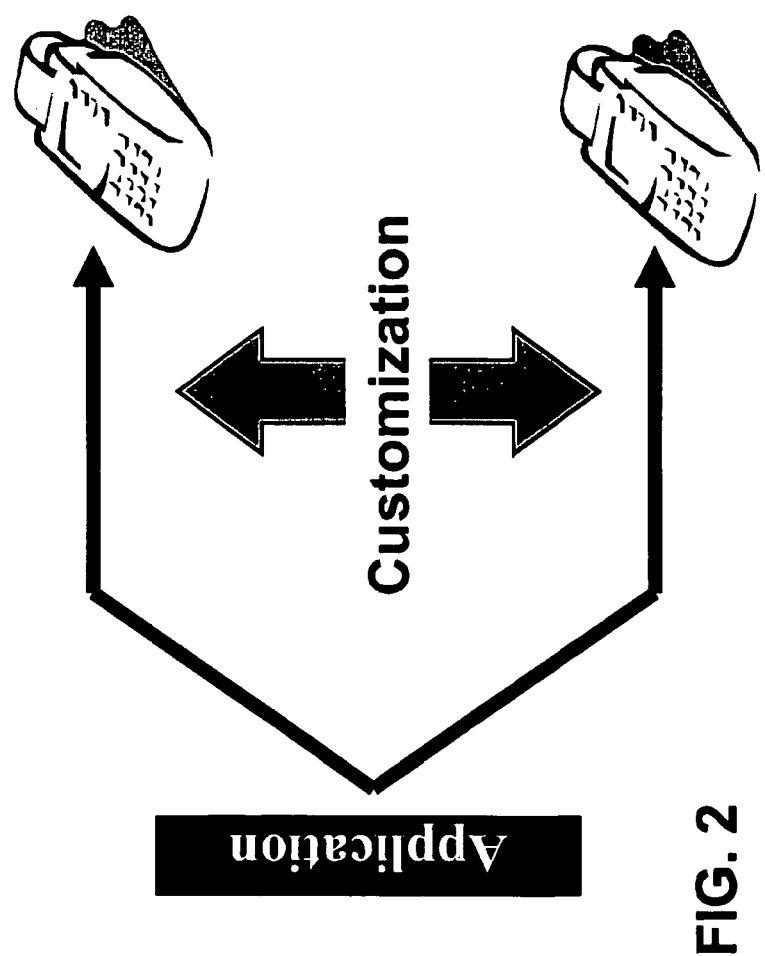
FIG. 2 depicts the individual customization of each POS terminal taught by the state of the art.

FIG. 2 shows how POS terminals 10 were usually upgraded. Prior to the present invention, the application needed to be customized, so as each porting has to be carried out for each POS terminal model. Such operation used to be executed individually, requiring specific knowledge and maintenance staff for each POS terminal system.

Figure 3:
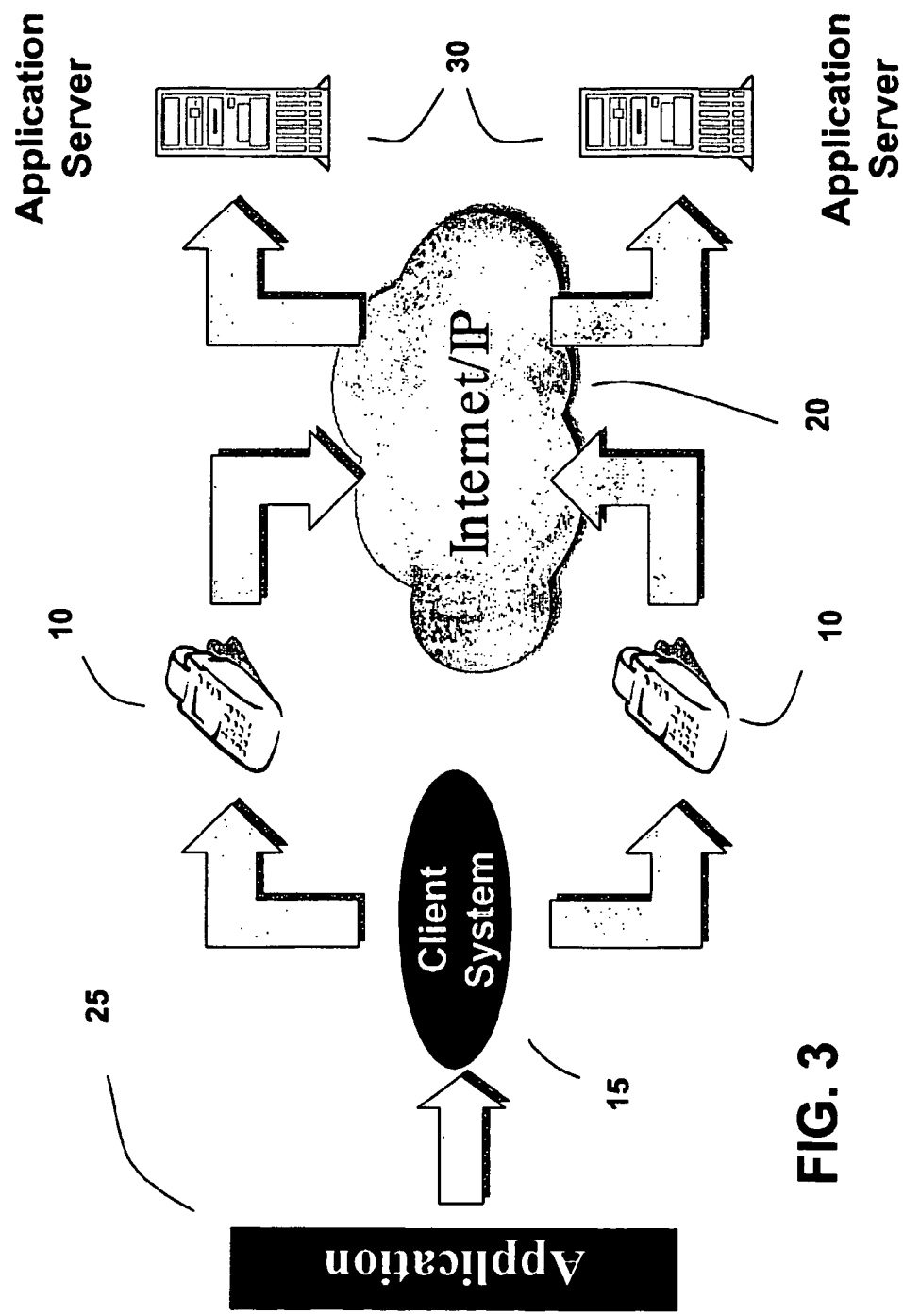
FIG. 3 depicts how the invention makes capable the communication of any customized POS terminal with an application server.

As it can be seen from FIG. 3, the client system operational environment allows sharing of an arbitrary amount of applications 25 in only one POS terminal 10, using application servers 30 connected through the network, also enabling to upgrade such applications remote and automatically and in real time.

PREFERRED EMBODIMENT OF THE INVENTION

In order to solve the problems described above, the present invention defines web client system extensions that adapt a standard WAP browser to use the POS peripherals and extend it to perform electronic operations.

The solution solves an existing problem with a new technology, joining the reliability and execution speed of ISO 8583 operations over legacy protocols, such as SDLC and X.28, with the maintainability and development speed of web applications.

When in operation, this client system 15 assumes the control of all of the POS terminal resources acting as the operational system itself. It enables any POS terminal 10 to run web applications 25 downloaded from application servers 30 connected to the POS network using HTTP on top of TCP/IP, optionally secured by SSL protocol, in a process similar to the Internet. TCP/IP access to the application server 30 can be done using a simple dial up connection, or a broadband network like, GPRS, CDMA 1X, Ethernet II and WiFi (IEEE 802.11).

POS web applications, consisting of WML pages, scripts and other files, perform ISO8583 electronic operations with the transaction server 35, pretending to be a conventional C application. Such operations flow both over SDLC/X.28 dial up connections or over TCP/IP broad band networks.

Figure 4:
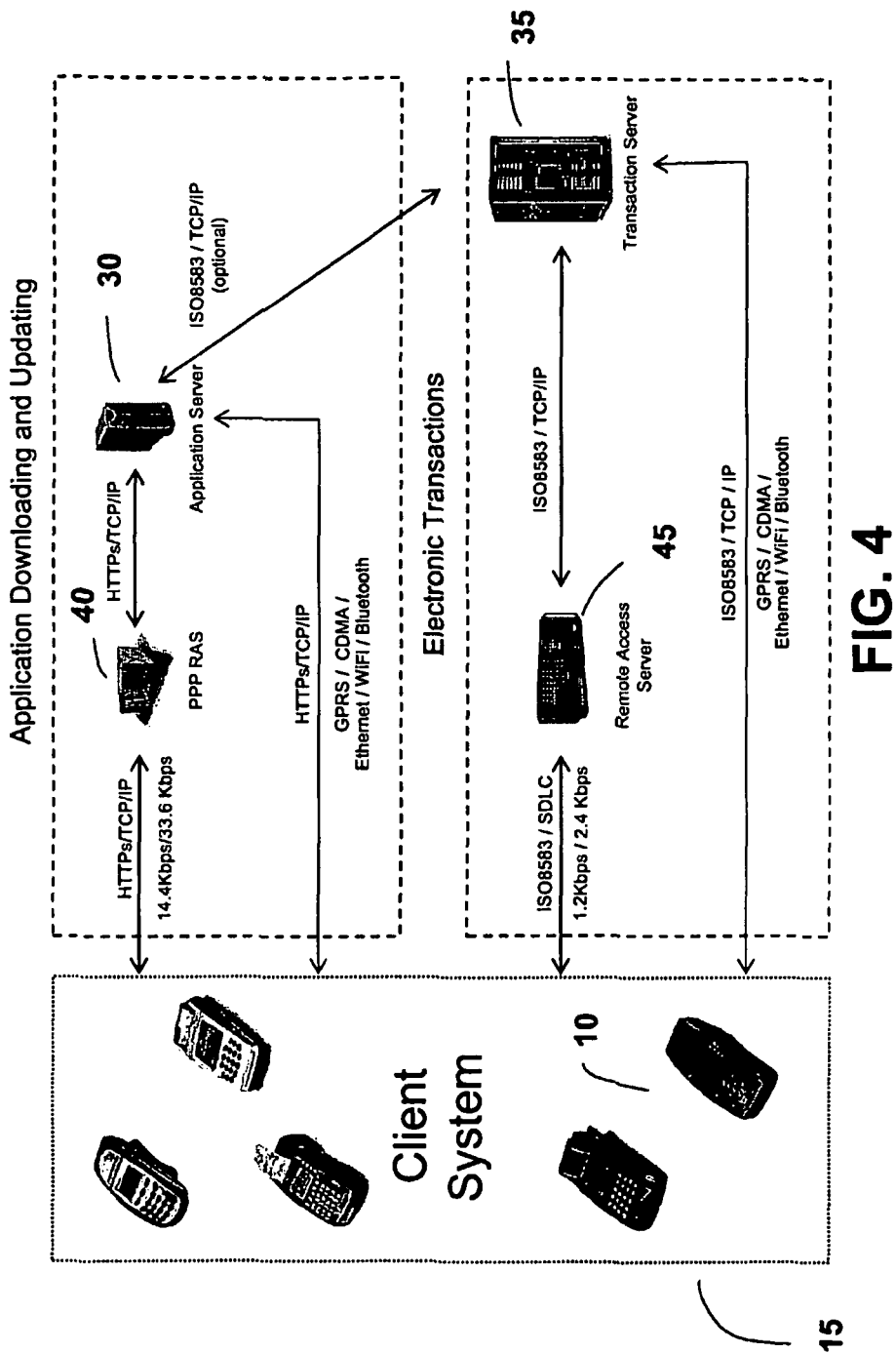
FIG. 4 depicts an uploading-downloading diagram and an electronic operation diagram being executed by the present invention.

This scheme is shown on FIG. 4. By observing such figure, it is possible to detect the two distinct situations on the POS client system 15 life cycle. The first one is when it connects to the application server 30 to download or update the web application and the second when this application connects to the transaction server 35 to perform an electronic transaction.

Figure 5:
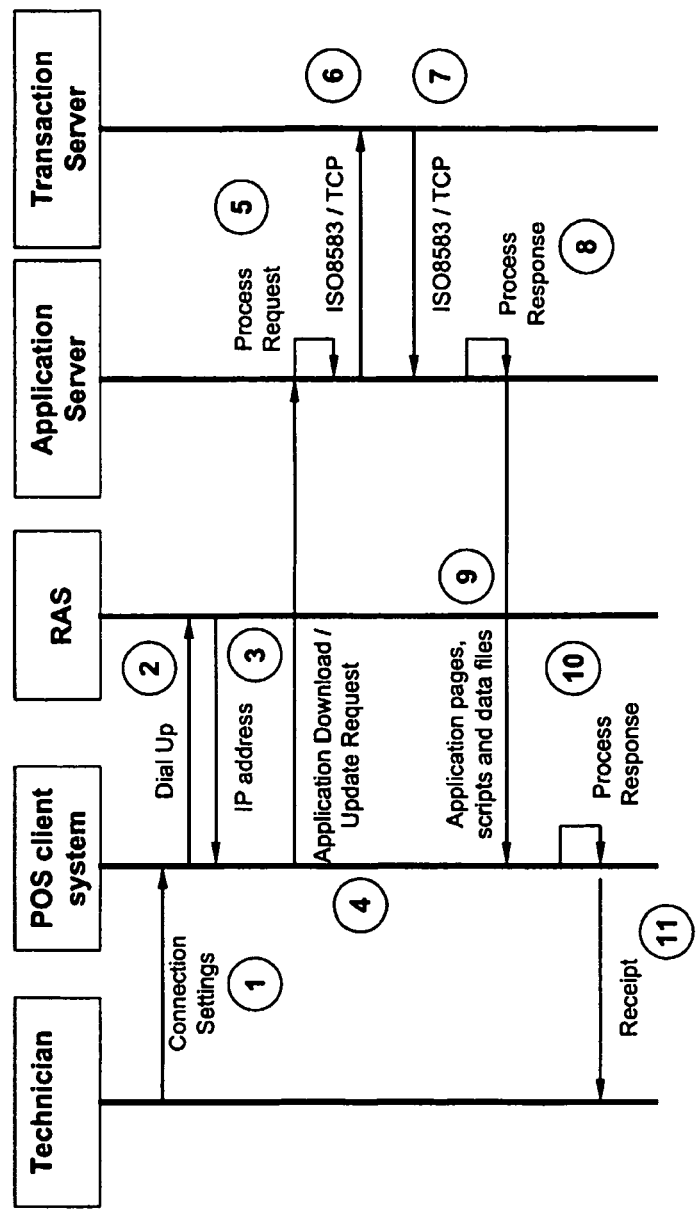
FIG. 5 depicts a diagram with POS client system application upload-download sequence.

Application download can be detailed within the following steps, according to FIG. 5:

1. Technician types the application server connection settings
2. POS client system 15 connects to a Remote Access Server (RAS) 45 or attaches to a broadband network.
3. POS client system 15 receives an Internet Protocol (IP) address.
4. POS client system 15 establishes a Transfer Control Protocol (TCP) session with the application server 30 and sends an application download/update request, usually with a HTTP (or HTTPs) POST command.
5. Application server 30 processes the request.
6. Application server 30 contacts the transaction server 35, pretending to be the POS Terminal 10, with an ISO8583 message on a TCP/IP connection.
7. Transaction server 35 responds to the application server 30 with the POS client system configuration settings.
8. Application server 30 processes the application settings and builds a customized version of the Web Application.
9. Application server 30 sends to the POS client system 15 the web application pages, scripts and data files.
10. POS client system 15 process the files received.
11. POS client system 15 emits a receipt of application download/updating completion to the technician
12. POS client system 15 automatically starts the Web Application.

The steps 6 and 7 above are optional in the solution. In another use case, the application server can simply download the whole application without the need of the application customization process or access to the transaction server.

Figure 6:
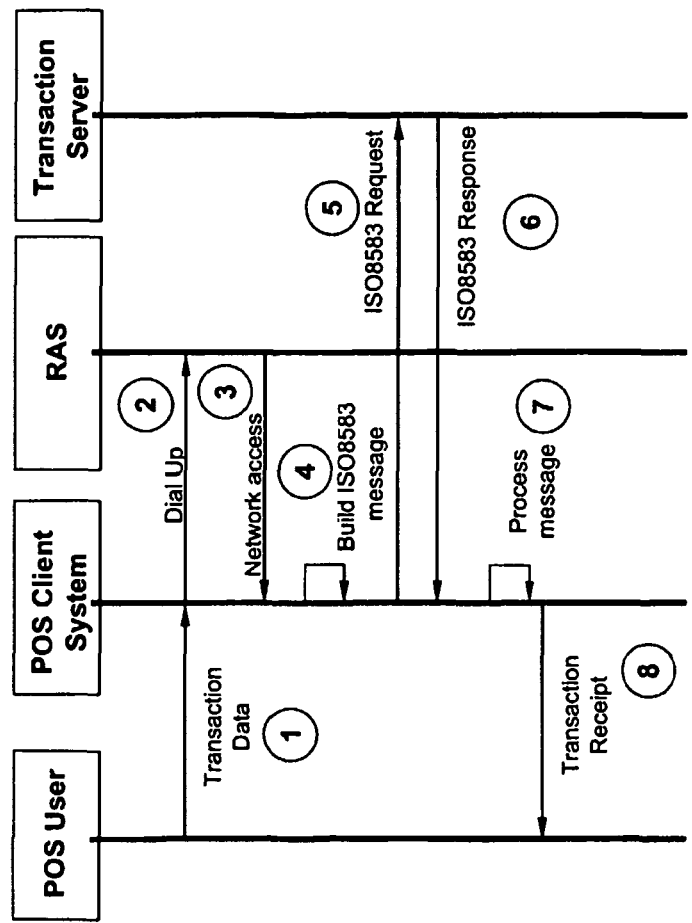
FIG. 6 depicts a diagram with POS client system Electronic operations sequence.
Figure 7:
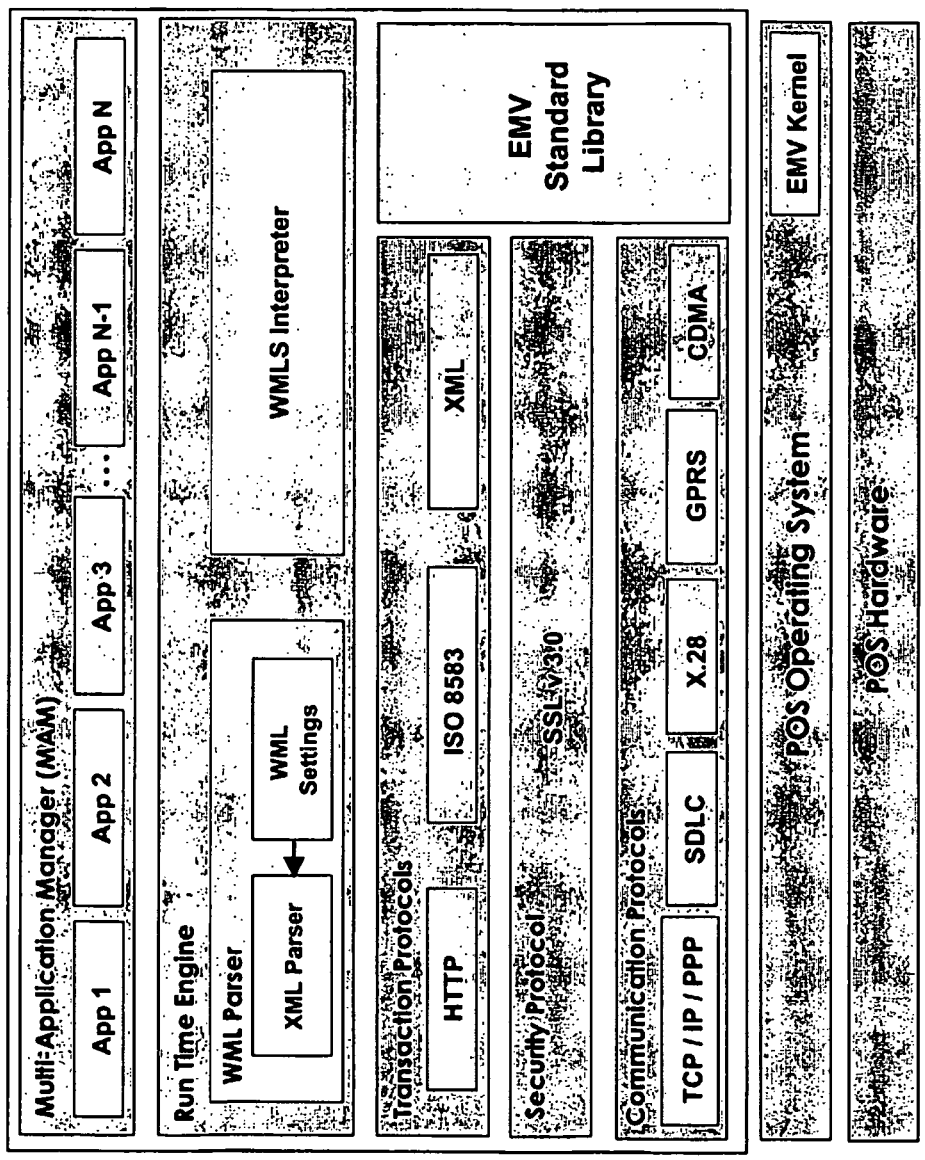
FIG. 7 depicts the POS client system architecture and protocol layers.

Further, electronic operations perform a simpler process that can be detailed with the following steps, as shown in FIG. 6:
1. POS user types the transaction data;
2. POS client system 15 connects to a Remote Access Server (RAS) 45 or attaches to a broadband network.
3. POS client system 15 receives network access.
4. POS client system builds an ISO8583 message.
5. POS client system sends the ISO8583 message to the transaction server 35.
6. Transaction server 35 responds to the POS client system with an ISO8583 message.
7. POS client system 15 process the received message.
8. POS client system 15 emits a transaction receipt.
1. Architecture and Protocol Layers In order to better define the invention the architecture of client system is detailed below and divided in specific layers as illustrated in FIG. 7.

1.1—Communication Protocol

Regarding communication protocols, the client system is able to run operations through one of the following protocols: TCP/IP/PPP, SDLC, X.28, GSM, GPRS, CDMA, Ethernet, Wi-Fi, Bluetooth, IR, etc. The application is in charge of selecting which protocol shall be used during a operation.

1.2—Security Protocol

The thin-client application exchanges data with the web server through the HTTPS protocol, which is based on the SSL 3.0 standard. The SSL layer runs on top of the TCP protocol and provides support for an HTTP client to establish secure connection with any compliant server.

The client system supports the following cipher suites: RSA+RC4+MD5 and RSA+3DES+MD5. Both of them support server certificate authentication and client certificate authentication in the PEM format. The cipher suite with 3DES also supports client certificate authentication in the PKCS12 format.

1.3—Transaction Protocols

The client system supports HTTP, ISO8583 and XML operations. HTTP operations are available through WML tag <go> and both GET and POST commands are supported. ISO8583 and XML operations are offered by WMLScript extensions. All protocols may coexist at the same application and may connect to distinct servers according to the application settings.

1.4—Run Time Engine

After prompting the user interface, the client system keeps waiting for the user interaction to trigger events against the runtime engine. These events are handled according to the current page definitions and may trigger some local WMLScript processing or invoking another page to be loaded. When a new WML page is loaded, it is parsed by the WML customized XML parser and a DOM syntax tree is generated. The tree is then traversed and the runtime internal structures are set to respond properly to the next user generated events. Both pages and scripts may be found at the cache of the client system or may be requested to an HTTP(S) server.

1.5—Multi-Application Manager (MAM)

The client system Multi-Application Manager allows more than one application resides and to be executed in the same POS. The client system isolates applications from other applications using different virtual execution environment. The resources (WMLs, scripts, data files and variables) can be created, read or updated by the owner application only.

The applications can be configured into the terminal from a PC, using a serial communication, or can be fetched from a server, over TCP/IP. The basic configuration is stored in a table of applications (TA) in the POS that stores information about the current set of applications.

MAM Main Functionalities:
  Application Automatic Load. Update or Delete—The master application, which has privileged rights and usually belongs to the POS owner, can request a application table update from the sever, in order to add, delete or update applications in that terminal. The same operation can be done for a technician through the configuration menu. See Multi-Application Configuration functionality described below.
  Communication Between Applications—the client system permits communication between applications. Application A can start application B, as well as send parameters from an application to another.
  Switching Between Applications—User can switch from an application to another by pressing a soft key that calls the client system main menu. From it users can select other applications.
  Application Table Validation—A Key is used to verify if the current valid application table (TA) belongs to the current POS. If the key does not match, a new TA is necessary.
  Multi-Application Configuration—An interface for the POS operator. Through it is possible to execute basic configuration and operation functions, including delete, add or update applications.

1.6—EMV Protocol Standard Library

In order to abstract distinct manufacturers terminal capabilities regarding the EMV protocol, the client system assumes the existence of an EMV library. This library is, actually, a PINPad interface library that encapsulates all the interactions between the client system and the POS EMV kernel.

The client system offers the EMV Library to the thin-client application as a WMLScript extension library, named PINPadLib.

2. Client System Extensions

Both WML and WML Script Languages were originally designed to create WEB Sites that can be displayed in WAP browsers, which are usually available in cell phones. In order to fulfill the requirements of a standard POS application, the invention defines some extensions to WML and WML Script Languages.

This set of WML tags, attributes and script functions allow, among other characteristics, that POS applications running over the client system: 1) access devices usually available in POS terminals such as card readers, printer, barcode readers, pin pad, Mifare contact-less card readers, check readers, etc. . . . ; 2) use multiple communication protocols when connected to distinct access networks (SDLC, X.28, TCP/IP, PPP, GPRS, CDMA, WNB, etc. . . . ); 3) persistent data record store; 4) access the EMV kernel presents in the POS operating system; 5) ISO8583 message formatting; 6) classified information cryptography; etc. . . .

The complete list of extensions as well as their detailed functionality is described below.

2.1—Tag Extensions to the WML Language

This section presents the new tags, and their attributes, provided to a WAP browser in order to turn it into a POS client system.

| Tag | Description | Interpreted Attributes |
| --- | --- | --- |
| beep | Starts beeping in the specified frequency until a key is hit. | frequency times—number of times the beep must go off. sync (true \| false)—plays the beep in exhibition time (true) or in runtime (false) when a redirection occurs |
| form | Allows data entry in pages containing tags <input> automatically positioning the cursor on the next field when hitting the <enter> key. If the number of lines between the two fields is higher than the number of lines on screen, the cursor will be positioned on the last line on screen. Its function is similar to tag's <p>, being defined in the same scope and accepting the same attributes and content. | None |
| pinpad | Makes it possible to use the pinpad in WML pages. It can be defined in the same scope as tag's <input>. Just like tag's <input>, it cannot have any content. The attributes explanation is on screen | name—Name of the variable that receives the entry. title—Text presented on the pinpad display maxlength—maximum length of the entry string type (text \| hidden \| password)—text and password are similar to the tag input homonym. Hidden, doesn't repeat the typed; it is used to confirm values masterkey—Encoded Key that goes with the pinpad (Provider) workingkey—Encoded Key provided by the user (Client) account—Card Number (More frequently used for VISA) |
| pre | Works in a similar way as HTML homonym tag. Shows a text with its contents in the way it was written. Has a similar function as tag <p>, being defined in the same scope and accepting the same attributes and contents. | None |
| report | Enables printing reports. The tag's contents are printed instead of being displayed on the screen. Its function is similar to tag's <p>, being defined in the same scope and accepting the same attributes and contents | footerLFs—Number of line-feeds characters at the end of the report height (1 \| 2)—font height width (1 \| 2)—font width |
| Setenv | Attributes and behavior are similar to <setvar>. The difference is that this one sets variables in the browsers persistent environment | name—Name of the variable receiving the value value—Value to be assigned |

| Tag | Description | Interpreted Attributes |
|---|---|---|
| Setfield | Attributes and behavior are similar to <postfield>. The difference is that this one sets a field into a Flexi-record structure to be sent to another application through a "vmac://" scheme href of the tag <go> | name—Flexi-record Id of the field to be set.<br>value—Value to be assigned<br>type—Type of the field (string \| int \| long) |

2.2—Attributes Extensions to the WML Language

This section presents the new attributes, values and standard attributes new behavior, provided to a WAP browser in order to turn it into a POS client system.

| Tag | Attributes | Description |
|---|---|---|
| Card | newcontext =<br>(true \| false \| vars) | New value: "vars" value initializes just the variables. |
|  | autoprint =<br>(true \| false) | New attribute: Automatically prints the current card contents. |
|  | dialup =<br>(true \| false) | New attribute: Connects automatically when showing the card. |
|  | hangup =<br>(true \| false) | New attribute: Disconnects automatically when showing the card. |
|  | persist =<br>(true \| false \| last \| none) | New attribute: Permits a deck to be persisted:<br>true—It will create a copy of the current file using the name "persist.wml". The older persisted file will be rename to "last_persist.wml"<br>false—No actions will be taken.<br>last—It will rename "last_persist.wml" to "persist.wml".<br>none—It will erase the file "persist.wml" so that it is not undesirably used. |
|  | onrefresh = hRef | New attribute: url to go when the refresh intrinsic event is triggered |
|  | onuserevent = hRef | New attribute: url to go when any user event (card switpe, keystroke, barcode reading) is triggered. Usually useful to idle screens. |
|  | onvalidate = hRef | New attribute: url to go after every input confirmation in the card current. |
| Go | Localsrc = hRef | New attribute: Path to the local file for the get and put operation. |
|  | src = hRef | New attribute: Path to the remote file for the get and put operation. |
|  | delimiter | New attribute: Delimiter for the postfields list. |
|  | user | New attribute: User login for servers that require access authorization. |
|  | password | New attribute: User password for servers that require access authorization. |
|  | hRef = hRef | New behavior: Send OS MAM events to other applications if set with a URLs like "osmam://LogAppName:EventNo". Arguments can be passed through TLV record structure with <setfield> tag or through HTTP format with "?" get syntax or with <postfield> tag. |
| Input | align =<br>(left \| right) | New attribute: Text aligns inside the input space. |
|  | Device =<br>(keypad \| keyboard \| barcode \| magnetic) | New attribute: Selected data entry device. Possible values are: magnetic—Magnetic card reader; barcode—Barcode reader; keyboard—External keyboard; keypad—Standard keyboard. |
|  | type =<br>(text \| password \| currency) | New value: The currency value forces the input value to have cents (e.g. "0.00") |
|  | alarm =<br>(true \| false) | New attribute: If true, sounds a beep when the input size has been reached. |
|  | filler | New attribute: Character to fill the input area in order to let the user aware of the size of the input. Its presence forces input masks to be shown prior typing and caret is suppressed. |
|  | fullformat =<br>(true \| false) | New attribute: Requires the entire input field to be fulfilled. |
|  | literals =<br>(true \| false) | New attribute: If true, suppresses the format characters form the variable value. |
| One-vent | type =<br>( . . . \| onrefresh \| onuserevent \| onvalidate) | New value: New "intrinsic" events that are triggered the same way as their <card> attribute counterparts. |
| Timer | abort =<br>(true \| false) | New attribute: Indicates if the timer can be disabled when a key is hit |

2.3—WML Script Functions Extensions to the WML Script Standard Libraries

This section presents extensions to the WML Script standard libraries, provided to a WAP browser in order to turn it into a POS client system. The definitions of such extensions Script Functions are explained below of the table.

| WML Script Standard Library | WML Script Extended Functions |
|---|---|
| FLOAT | toFloat(value) |
| STRING | setElementsPos(String, separator, nElements)<br>elementAtPos(elementPos)<br>formatCurrency(currencyString)<br>isNumeric(string)<br>toUpper (string)<br>toLower (string)<br>padRight (string, pad, len)<br>padLeft (string, pad, len) |
| URL | loadFile (url, fileName)<br>loadToCache (url) |
| WMLBROWSER | setEnv(Name, Value)<br>goExt(url, method, blsBack)<br>beep(Freq, nTimes)<br>hangUp( )<br>dialup( ) |

| WML Script<br>Standard Library | WML Script<br>Extended Functions |
|---|---|
| | Persist( )<br>setPostfield (name, value)<br>clearCacheWithTag (tag)<br>getFirstVarName ( )<br>getNextVarName ( )<br>getPrevVarName ( )<br>pin2pin( )<br>dial(StringtoWhere)<br>upLoad( )<br>addEnv(varName, increment)<br>appendVar(varName, value)<br>setEnvFromVars(varName, varList)<br>setVarsFromEnv(varName)<br>getVarFromEnv(envVarName, varName)<br>deleteContext(appName)<br>isConnected( )<br>installApp(appDataFile)<br>setVarFromVars(varName, varList)<br>setVarsFromVar(varName)<br>getVarFromVar(wmlVarName, varName)<br>getVarFromStr(wmlsStringOrVar, varName) |
| DIALOGS | show(message, defaultInput)<br>showStatus(message, defaultInput) |

Specific Functions Created to the POS Client System:

toFloat(value)—This function returns the floating-point representation of a given value. This function executes, exactly, the same type conversions defined for WMLScript language. An invalid value returns the string "invalid". Required to force type conversion when typed variables are used.

setElementsPos(String, separator, nElements)—This function stores nElements of String separated by separator. In case it succeeds, it returns an integer, which contains the position of the last character of the last element stored. Usually, it's used before a call to String.elementAtPos (elementPos) shown below.

elementAtPos(elementPos)—This function returns the element of a string, which is in the position elementPos. The string must already have been organized with the application of the function setElementsPos(String, separator, nElements). If the string is not already organized by function setElementsPos, the one that was previously organized will be used. In case of error, it returns invalid.

formatCurrency(currencyString)—This function formats a String in currency notation, separating the cents with a comma or period mark, as well as the thousands and so on. The function returns the String formatted or invalid in case it fails.

isNumeric(string)—This function returns true if the argument can successfully be converted to a numeric value, otherwise, it returns false.

toUpper (string)—This function returns string argument converted to uppercase.

toLower (string)—This function returns string argument converted to lowercase.

padRight (string, pad, len)—This function returns string argument right-padded with pad character up to the length len.

padLeft (string, pad, len)—This function returns string argument left-padded with pad character up to the length len.

loadFile (url, fileName)—This function retrieves the content denoted by the absolute url and save at a file named fileName. It already strips out HTTP headers and returns the HTTP result code (200 means Ok).

loadToCache (url)—This function retrieves the content denoted by the absolute url and stores it in the client system cache for future usage. It returns the HTTP result code (200 means Ok).

setEnv(Name, Value)—This is an extension that receives as parameters the name of the environment variable of POS and the value to be attributed to this variable. Returns true if it succeeds changing the variable value or false, if it does not. In case of failure (invalid parameters, for example), it returns invalid.

qoExt(url, method, blsBack)—This extension of the function WMLBrowser.go( ) allows the forward or return to a defined URL. The return to a WML page will require the realization of the "onenterbackward" event, in case it is foreseen. It receives as parameters the url, the method (POST or GET), and a logic value blsBack, indicating the return to the URL. Returns the empty string in case it succeeds, otherwise, it returns invalid.

beep(Freq, nTimes)—This function emits a sound in the output device in the frequency specified by Freq, and the number of times specified by nTimes. Returns the empty string in case it succeeds, otherwise, it returns invalid.

hangUp( )—This function disconnects the POS from the telephone line. Returns the empty string.

dialup( )—This function starts the asynchronous connection of POS to the telephone line. Returns the empty string.

persist( )—This function generates a copy of the current Script with the name "i:persist.wmlsc". In case this file already exists, it will be renamed to "i:last_persist.wmlsc". Returns the number of bytes recorded in the file "i:persist.wmlsc". If the current script have already erased itself by clearing the cache, then the result of calling persist is undefined and may result in runtime error.

setPostfield (name, value)—This function sets post fields that are supposed to be sent with the next call to WMLBrowser.goExt(href,"POST",true). It returns the empty string if it succeeds, otherwise it returns invalid.

clearCacheWithTag (tag)—This function erases from cache every file that presents a "VWTag:" HTTP header beginning with tag.

aetFirstVarName( )—This function returns the name of the first environment variable. Together with getNextVarName( ) and getPrevVarName( ) it offers an iterator to the persistent environment.

getNextVarName( )—This function returns the name of the first environment variable. Together with getFirstVarName( ) and getPrevVarName( ), it offers an iterator to the persistent environment.

getPrevVarName( )—This function returns the name of the first environment variable. Together with getFirstVarName( ) and getNextVarName( ), it offers an iterator to the persistent environment.

pin2pin( )—This function starts an Operating System driven "back to back" client system clone.

dial(String toWhere)—This function set the dial parameters from a configuration in a record store. Returns the connection status.

getConStatus( )—This function returns an integer whose value is the connection status.

upLoad( )—This function starts the "back to back" application cloning upload.

addEnv(varName, increment)—This function receives as parameters the name of the environment variable of POS and an integer value to be added to this variable's current value. If the variable does not exists it is created with the value received as parameter. Returns true if it succeeds changing the variable value or false, if it does not. In case of failure (invalid parameters, for example), it returns invalid.

appendVar(varName, value)—This function receives as parameters the name of the environment variable of POS and a string value to be appended to this variable's current value. If the variable does not exists it is created with the value received as parameter. Returns true if it succeeds changing the variable value or false, if it does not. In case of failure (invalid parameters, for example), it returns invalid.

setEnvFromVars(varName, varList)—This function sets the environment variable varName with the variables defined in the semi-colon separated var name list varList. It returns the len of the string set to varName, which should be saved for future usage with the functions setVarsFromEnv( ) or getVarFromEnv( ).

setVarsFromEnv(varName)—This function sets the WML context with the variables got from the value of environment variable varName. It returns the number of variables set, which should have been saved with function setEnvFromVars( ).

getVarFromEnv(envVarName, varName)—This function returns the value of the variable named varName from the value of environment variable envVarName. If the variable is not defined by the value it returns the empty string.

deleteContext(appName)—This Function completely deletes the files of application named appName. It can only be called by the POS Master Application.

isConnected( )—This function replaces getConStatus( ) returns a Boolean indicating whether the connection is on.

installApp(appDataFile)—This function installs an application from a datafile named appDataFile and returns a integer indicating the error code. If this function runs well, terminal will be restarted and retrun code will not be tested.

setVarFromVars(varName, varList)—This function sets WML variable varName with the variables defined in the semi-colon separated var name list varList. It returns the len of the string set to varName, which should be saved for future usage with the functions setVarsFromVar( ) or getVarFromVar( ).

setVarsFromVar(varName)—This function sets the WML context with the variables got from the value of the WML variable varName. It returns the number of variables set, which should have been saved with function setVarFromVars( ).

getVarFromVar(wmlVarName, varName)—This function returns the value of the variable named varName from the value of WML variable wmlVarName. If the variable is not defined by the value it returns the empty string.

getVarFromStr(wmlsStringOrVar, varName)—This function returns the value of the variable named varName from the value of a WMLScript variable or string wmlsStringOrVar. If the variable is not defined by the value it returns the empty string.

show(message, defaultInput)—This function shows a message on the POS screen and continue the execution regardless the user's request. In case it succeeds, it returns the empty string, otherwise, it returns invalid.

showStatus(message, defaultInput)—This function shows a message in the Status line on the POS screen. In case it succeeds, it returns the empty string, otherwise, it returns invalid.

2.4—WML Script Libraries and Functions—Extensions to the WML Script Standard Libraries This section presents the WML Script extension libraries provided to a WAP browser in order to turn it into a POS client system.

| Extended Library | Extended Functions |
| --- | --- |
| RECORDSTORE | openStore (Name, CreateIfNecessary) |
| | CloseStore(StoreId) |
| | deleteStore (Name) |
| | getNumRecords(StoreId) |
| | getSize(StoreId) |
| | addRecord(StoreId, Record) |
| | deleteRecord(StoreId, RecordId) |
| | getRecord(StoreId, RecordId) |
| | getNextRecordId(StoreId, RecordId) |
| | getRecordSize(StoreId, RecordId) |
| | setRecord(StoreId, RecordId, RecordValue) |
| | createDatabase(BaseName, SourceName) |
| | findRecord (DB, Key, Pos, Separator, Ordered) |
| | setOrderKey(DB, Pos, Separator) |
| | findFirstRecord(StoreId) |
| | findNextRecord(StoreId) |
| | findRepeatedRecord (DB, Key, Pos, Separator, Ordered) |
| | defragStore (StoreName) |
| | appendLastRecord (StoreId, string) |
| | addRecordFromVars (StoreId, varList) |
| | setVarsFromRecord (StoreId, RecordId) |
| | getVarFromRecord (StoreId, RecordId, VarName) |
| | setView(DB, Key, Pos, Separator) |
| | deleteView(DB) |
| | setFilterView((DB, Key, Pos. Separator) |
| CONSOLE | print(string) |
| | printLn(string) |
| CRYPTO | encrypt (Message, SessionKey) |
| | decrypt(Message, SessionKey) |
| | encrypt2DES (Message, SessionKey) |
| | decrypt2DES (Message, SessionKey) |
| | xor (string1, string2) |
| | encrypt2DESHexa (Message, SessionKey) |
| | decrypt2DESHexa (Message, SessionKey) |
| | encryptHexa (Message, SessionKey) |
| | decryptHexa(Message, SessionKey) |
| PRINTER | open( ) |
| | setWidthMode(mode) |
| | setHeightMode(mode) |
| | print(string) |
| | printLn(string) |
| | close( ) |
| | printLGO(LOGOFileName) |
| CARD | checkRanges(currentPAN, privateLabelSuffix) |
| | checkRangesInStore (currentPAN, StoreName) |
| SYSTEM | currentTimeSecs ( ) |
| | datetime2Seconds (datetime) |
| | seconds2datetime (seconds) |
| | isValidDate (datetime) |
| | datetime ( ) |
| | currentTicks ( ) |
| ISO | charToHex(String) |
| | hexToChar(String) |
| | readPackager(String) |
| | transactMessage(String host, Int port, String fieldlist, String channel, String header, String trailler, String mandatoryFields) |
| | transactFromRecord(String host, Int port, Int storeId, Int recordId, String channel, String header, String trailer, String mandatoryFields) |
| | transactFromRecordToVar(String host, Int port, Int storeId, Int recordId, String channel, String header, String trailer, String mandatoryFields) |
| | hexToInt(String hexa, Boolean BigEndian) |
| | intToHex(Int i, Boolean BigEndian) |

Specific Libraries and Functions Created to the POS Client System:

2.4.1—RECORDSTORE Extended Library

The aim of this library is to allow the persistence of information, storing the data in indexed files.

List of Functions:

openStore (Name, CreateIfNecessary)—This function receives as parameters the name of the file to be created and a boolean variable CreateIfNecessary, pointing if the file should be created in case it doesn't exists. At the same time of the file creation, also a respective index file is created. Returns an integer with the index (id) of the open file or invalid, in case fails to open or create the file.

closeStore(StoreId)—This function receives as parameter the index (StoreId) of the opened file, closing the data and index files. Returns an integer with the index (StoreId) of the closed file. If it does not succeed on closing the file or if StoreId does not exist, it returns invalid.

deleteStore (Name)—This function receives as parameter a string, Name, containing the name of the opened file and deletes this data file, as well as its index file. Returns an integer greater or equal to zero if it succeeds deleting the files. If it does not succeed, it returns invalid.

getNumRecords(StoreId)—This function receives as parameter an integer, StoreId, containing the index of the opened file and obtains the number or records registered. Returns and integer greater or equal to zero if it succeeds obtaining the number of records. Otherwise, it returns invalid.

getSize(StoreId)—This function receives as parameter an integer, StoreId, containing the index of the opened file and gets its size in bytes. If the operation is successful it returns an integer with the file size (total number of bytes), otherwise it returns invalid.

addRecord(StoreId, Record)—This function receives as parameter an integer, StoreId, containing the index of the opened file and one string, Record, containing the data to be included in the file. If it succeeds appending, it returns an integer with the index of the appended record in the data file, otherwise, it returns invalid.

deleteRecord(StoreId, RecordId)—This function receives two integers as parameters: StoreId, containing the index of the opened file and RecordId, containing the index of the record to be excluded of the file. If it succeeds deleting, it returns an integer with the index of that deleted record, otherwise, it returns invalid.

getRecord(StoreId, RecordId)—This function receives two integers as parameters: StoreId, containing the index of the opened file and RecordId, containing the index of the record to be retrieved. If it succeeds the reading operation, it returns an integer with the index of that retrieved record, otherwise, it returns invalid.

getNextRecordId(StoreId, RecordId)—This function receives two integers as parameters: StoreId, containing the index of the opened file and RecordId, containing the index of the previous record to be retrieved. If it succeeds finding the index of the next record, it returns the index as an integer, otherwise, it returns invalid.

getRecordSize(StoreId, RecordId)—This function receives two integers as parameters: StoreId, containing the index of the opened file and RecordId, containing the index of the record to be sized. If it succeeds finding the record index, it returns an integer with its size in bytes, otherwise, it returns invalid.

setRecord(StoreId, RecordId, RecordValue)—This function receives as parameter the integers StoreId, containing the index of the opened file and RecordId, containing the index of the record to be changed and the string RecordValue, containing the new values to be recorded. This function is useful to update information in a given record, as long as it does not alter its size. In case of well-succeeded changing, the RecordId of that record will be returned, otherwise the return value will be invalid. If the size of the record is not the same, it returns invalid. In this case, it must be excluded and new information in a new record should be recorded.

createDatabase(BaseName, SourceName)—This function creates a record store under the name Basename from a source file SourceName, both provided as parameters. The function returns a zero or a positive integer if it succeeds. It returns invalid if it can not create the record store.

findRecord (DB, Key, Pos, Separator, Ordered)—This function searches a string Key located in the position Pos related to the Separator. If the file DB is organized in relation to the desired field, the parameter Ordered may be equal to true, allowing the realization of a binary search in DB.

setOrderKey(DB, Pos, Separator)—This function defines the search order in the DB file according to the position Pos in relation to the separator, for the functions findFirsRecord( ) and findNextRecord( ).

findFirstRecord(StoreId)—This function receives as parameter the handle (StoreId) of the opened file and returns its first record index. Function setOrderKey( ) must have been called previously. Returns an integer index related to the position of the first record according to the order defined by the function setOrderKey(DB, Pos, Separator), or invalid in case of failure (it can't open the file, for example).

findNextRecord(StoreId)—This function receives as parameter the handle (StoreId) of the opened file and returns the next record index. Function findFirstRecord( ) must have been called previously. Returns an integer index related to the position of the next record according to the order defined by the function setOrderKey(DB, Pos, Separator), or invalid in case of failure (it can't open the file, for example).

findRepeatedRecord (DB, Key, Pos, Separator, Ordered)—This function works like findRecord( ), but it considers the occurrence of records with repeated keys. Returns the Id of the founded record.

defragStore (StoreName)—This function physically removes deleted records from the RecordStore named StoreName. The record Store must not be opened when it is called. It returns invalid if it fails.

appendLastRecord (StoreId, string)—This function appends the string argument to the content of the last physical record, if it is not deleted. It should to be called right after addRecord( ). It returns the RecordId.

addRecordFromVars (StoreId, varList)—This function adds a record to opened RecordStore identified by StoreId with the variables defined in the semi-colon separated var name list varList. It returns the id of the added record, which should be saved for future usage with the functions setVarsFromRecord( ) or getVarFromRecord( ).

setVarsFromRecord (StoreId, RecordId)—This function sets the WML context with the variables got from the record identified with RecordId of the opened RecordStore identified by StoreId. It returns the id of added record read, which should have been saved with function addRecordFromVars( ).

getVarFromRecord (StoreId. RecordId, VarName)—This function returns the value of the variable named VarName from the record identified with RecordId of the opened RecordStore identified by StoreId. If the variable is not defined by the record it returns the empty string.

setView(DB, Key, Pos, Separator)—This function defines a navigation filter for a record store DB, having value key on the field at the position Pos in relation to the separator. The record store is supposed to be ordered by the same field. Views created with this function offer a fully transparent selection at the record store to the basic navigation functions.

deleteView(DB)—This function deletes the records selected by the view currently set for a record store DB.

setFilterView(DB, Key, Pos. Separator)—This function defines a navigation filter for a record store DB, having value key on the field at the position Pos in relation to the separator. The record store is not supposed to be ordered by any field. Views created with this function offer a fully transparent selection at the record store to the basic navigation functions, although records out of the view will be sequentially skipped when RecordStore.getNextRecordId( ) be called.

2.4.2 CONSOLE Extended Library

This Library contains a set of functions used for application debugging.

List of Functions:

print(string)—This function shows the text of debugging string in the information window of the client system. No new line character is inserted after the text. Returns 1 if it succeeds on showing or, otherwise, invalid.

printLn(string)—This function shows the debugging text string on the information window of the client system. It inserts a new line character after the text. Returns 1 if it succeeds showing, otherwise, it returns invalid.

2.4.3 CRYPTO Extended Library

This Library contains a set of functions used for the ciphering and deciphering of information to be transmitted with more security through the web.

List of Functions:

encrypt (Message, SessionKey)—This function returns the message parameter encrypted with DES algorithm. If message size is greater than 512 bytes or if the ciphering does not succeed, the message returns invalid. SessionKey is the 16 bytes string corresponding to an 8 byte key hex-encoded. The return value is an ascii string hex-encoded with the double length of the Message argument.

decrypt(Message, SessionKey)—This function returns the message parameter decrypted with DES algorithm. If Message size is greater than 1024 bytes or if the ciphering does not succeed, the message returns invalid. SessionKey is the 16 bytes string corresponding to an 8 byte key hex-encoded. Message parameter is supposed to be an ascii hex-encoded string with the double length of the returned value.

encrypt2DES (Message, SessionKey)—This function returns the message parameter encrypted with DES algorithm. Prior to encrypting, it prefixs the Message with the BCD representation of its length. If Message size is greater than 512 bytes or if the ciphering does not succeed, the message returns invalid. SessionKey is the 16 bytes string corresponding to an 8 byte key hex-encoded. The return value is an ascii string hex-encoded with the double length of the Message argument.

decrypt2DES (Message, SessionKey)—This function returns the message parameter decrypted with DES algorithm. If Message size is greater than 1024 bytes or if the ciphering does not succeed, the message returns invalid. Message parameter is supposed to be an ascii string hex-encoded with the double length of the returned value plus the size of the length of the string.

xor (string1, string2)—This function receives two hex-encoded ascii strings and returns the hex-encoded ascii string corresponding to xor between their binary values.

encrypt2DESHexa (Message, SessionKey)—This function returns the message parameter encrypted with DES algorithm. Prior to encrypting, it prefix the Message with the BCD representation of its length. Message argument is supposed to be an hex-encoded ascii string. If Message length is greater than 1024 bytes or if the ciphering does not succeed, the message returns invalid. SessionKey is the 16 bytes string corresponding to an 8 byte key hex-encoded. The return value is an ascii string hex-encoded with the same length of the Message argument.

decrypt2DESHexa (Message, SessionKey)—This function returns the message parameter decrypted with DES algorithm. If Message size is greater than 1024 bytes or if the ciphering does not succeed, the message returns invalid. SessionKey is the 16 bytes string corresponding to an 8 byte key hex-encoded. Message parameter is supposed to be an ascii string hex-encoded with the same length of the returned value plus the size of the length of the string.

encryptHexa (Message, SessionKey)—Same as encrypt, but message is in hexadecimal representation. The return value is an ascii string hex-encoded with the double length of the Message argument.

decryptHexa(Message, SessionKey)—Same as encrypt, but message is in hexadecimal representation. The return value is the message parameter decrypted with DES algorithm.

2.4.4—PRINTER Library

This library contains a set of functions used for printing.

List of Functions:

open( )—This function opens the output to the printer. If it succeeds, it returns the obtained handle, otherwise it returns invalid.

setWidthMode(mode)—This function configures the width to the font being sent to the printer, taking as a base the mode parameter. Mode must be conversion to integer or floating-point compliant. If it succeeds it returns true, if not or the parameter mode is illegal, it returns invalid.

setHeightMode(mode)—This function configures the height of the font being sent to the printer, taking as a base the parameter mode. Mode must be conversion to integer or floating-point compliant. If it succeeds it returns true, if not or the parameter mode is illegal, it returns invalid.

print(string)—This function prints the content of string. Returns true if the print succeeds, otherwise, it returns invalid.

printLn(string)—This function prints the content of string and adds a new line character after the print. Returns true if the print succeeds, otherwise, it returns invalid.

close( )—This function closes the output to the printer, returning an empty string ("").

printLogo(LOGOFileName)—This function receives as parameter the path to the file where the bitmap, in LGO format, that will be printed is located. The function returns either a negative value in case it fails or "1" in case it succeeds printing.

2.4.4 CARD Library

This library contains a set of functions used for financial card BIN range check.

List of Functions:

checkRanges(currentPAN, privateLabelSuffix)—This function checks the range of the given card PAN against those read from the POS environment on variables MAX/b/X and MIN/b/X, where lbl stands for the given privateLabelSuffix and X stands for the counter of ranges for that label. X begins at 0. If the currentPAN fits to range X then INF/b/X. If it does not fit to any range, it returns invalid. If no private label suffix is give, it assumes default value "PAN".

checkRangesInStore (currentPAN, StoreName)—This function checks the range of the given card PAN against those read from the records of the StoreName RecordStore. Each record is supposed to have a semi-colon separated three-element string, e.g. "4400;4999;returnedinfo". The PAN is checked against the two first elements of each record until it fits in-between them. The function returns the third element of the first record that fits. If it does not fit to the range of any record, it returns invalid.

2.4.5 SYSTEM Library

This library contains a set of functions used for accessing system time utilities.

List of Functions:

currentTimeSecs( )—This function returns the current POS time in seconds from Jan. 1, 1970, 00:00:00.

datetime2Seconds (datetime)—This function returns the number of seconds passed from Jan. 1, 1970, 00:00:00 to the date and time expressed by datetime with format "YYYYMMDDHHMMSS".

seconds2datetime (seconds)—This function returns the date and time corresponding to number of seconds passed from Jan. 1, 1970, 00:00:00 expressed by seconds. Return value is with format "YYYYMMDDHHMMSS".

isValidDate (datetime)—This function returns true if the datetime argument is expresses a valid date/time with format "YYYYMMDDHHMMSS".

datetime( )—This function returns the current POS date and time. Return value format is "YYYYMMDDHHMMSS".

currentTicks( )—This function returns the number of milliseconds since the POS was started.

2.4.6 ISO Library

This library contains a set of functions to deal with ISO-8583 messages.

charToHex(String)—This function receives a String as Input and returns another String with the HEXADECIMAL representation of the input String in ASCII.

hexToChar(String)—This function receives a String as Input that is a HEXADECIMAL representation of a String (in ASCII) and returns the String represented. The returning String will always have the half size of the source String. If the source String length is odd, the function will return invalid.

readPackager(String)—This function updates the packager used to pack the ISO-8583 message. The input String is the PATH of the file with the packager definition.

The returning value is the error code. If return is zero, no error occurred.

The format of the file that defines the packager is:
FIELDID=PACKAGER;LEN<;INNERPACKAGER FILEPATH>
Example:
this is a comment
0=IFB_NUMERIC;4
1=IFB_BITMAP;16
2=IFB_LLNUM;19
3=IFB_NUMERIC;6
4=IFB_NUMERIC;12
34=IFB_LLLIBINARY;999;f:subdetpdf To reduce the size of the file and decrease the parsing time, space characters are not allowed in a packager definition file. This file is a regular text file (text format).

The ISO fields have a packager, that identifies the format the data will be sent in the ISO message. A field can, optionally, have inner fields. A inner packager can be defined to let the client system parse the field. To this happens, a file path containing the inner packager definition can be specified. The possible packagers are: IFB_BITMAP, IF_HEX, IFALLHEX, IFA_LLLHEX, IFB_LLHEX, IFB_LLLHEX, IF_BINARY, IFA_LLBINARY, IFA_LLLBINARY, IFB_LLBINARY, IFB_LLLBINARY, IF_CHAR, IFA_LCHAR, IFA_LLCHAR, IFA_LLLCHAR, IFB_LLCHAR, IFB_LLLCHAR, IFA_NUMERIC, IFA_LLNUM, IFA_LLLNUM, IFB_NUMERIC, IFB_LLNUM, IFB_LLLNUM, IFA_AMOUNT, IFB_AMOUNT, IFB_LLLIHEX, IFB_LLLIBINARY, IFB_LLLICHAR and IFB_LLLINUM.

There are 6 types of packager: Numeric, Amount, Character, Hexa, Binary and Bitmap.

The L, LL or LLL characters indicates the maximum size of a field. If a field is IFA_LLLNUM, means that its size cannot be greater than 999.

The IFA or IFB prefix indicates that the numeric portion of a field is stored in ASCII or BCD.

The 'I' in some packager names (ex: IFB_LLLINUM) indicates that the field will be identified. This is useful for defining inner packagers, where the inner fields should be identified.

Numeric: This packager receives a String with a numeric representation (ex:"12345").
Results:

| | |
|---|---|
| IFA_NUMERIC: 12345 | (number sent as a String) |
| IFA_LLNUM: 0512345 | (the field size in ASCII) |
| IFA_LLLNUM: 00512345 | (the field size in ASCII) |
| IFB_NUMERIC: x12 x34 x50 | (number stored in BCD) |
| IFB_LLNUM: x05 x12 x34 x50 | (field size also in BCD) |
| IFB_LLLNUM: x00 x05 x12 x34 x50 | (field size also in BCD) |
| IFB_LLLINUM: x00 x05 x23 x12 x34 x50 | (id is 23. Also in BCD) |

Amount: This packager is similar to the numeric, except the fact that is preceded by a character that indicates the signal. The input for this packager may be a String like "D12050".
Results:

| | |
|---|---|
| IFA_AMOUNT: C12345 | (number sent as a String) |
| IFB_AMOUNT: x43 x12 x34 x50 | (number sent in BCD) |

Character: This packager receives a String like "this text is ok! 12345".
Results:

| | |
|---|---|
| IFA_CHAR: 12345 | (field sent as a String) |
| IFA_LCHAR: 512345 | (the field size in ASCII) |
| IFA_LLCHAR: 0512345 | (the field size in ASCII) |
| IFA_LLLCHAR: 00512345 | (the field size in ASCII) |
| IFB_CHAR: x31 x32 x33 x34 x35 | (field sent as a String) |
| IFB_LLCHAR: x05 x31 x32 x33 x34 x35 | (field size in BCD) |
| IFB_LLLCHAR: x00 x05 x31 x32 x33 x34 x35 | (field size also in BCD) |
| IFB_LLLICHAR: x00 x05 x23 x31 x32 x33 x34 x35 | (id is 23. Also in BCD) |

Hexa:
This packager receives a String representing (in hexadecimal) a binary field. The hexa String is converted into a binary field and appended in the message.

Results:

| | |
|---|---|
| IF_HEX: x31 x32 x33 x34 x35 | (field sent in binary) |
| IFA_LLHEX: x30 x35 x31 x32 x33 x34 x35 | (size (05) in ASCII) |
| IFA_LLLHEX: x30 x30 x35 x31 x32 x33 x34 x35 | (size (005) in ASCII) |
| IFB_LLHEX: x05 x31 x32 x33 x34 x35 | (size (05) in BCD) |
| IFB_LLLHEX: x00 x05 x31 x32 x33 x34 x35 | (size (005) in BCD) |

Binary:

This packager receives a binary buffer and creates a binary field in the message. As there is not a binary type for WMLScript, this packager was intentionally created to wrap inner fields. The inner fields may be numeric+char and the outer field should be defined as binary. As packing the inner fields, the binary buffer result (outer field) will be packed automatically as binary by the engine.

Results:

| | |
|---|---|
| IF_BINARY: x31 x32 x33 x34 x35 | (field sent in binary) |
| IFA_LLBIN: x30 x35 x31 x32 x33 x34 x35 | (size (05) in ASCII) |
| IFA_LLLBIN: x30 x30 x35 x31 x32 x33 x34 x35 | (size (005) in ASCII) |
| IFB_LLBIN: x05 x31 x32 x33 x34 x35 | (size (05) in BCD) |
| IFB_LLLBIN: x00 x05 x31 x32 x33 x34 x35 | (size (005) in BCD) |

Bitmap:

This is a special packager that stores a binary bitmap in the message. This bitmap is created based on the existence of the message fields. This packager is used for field 1.

transactMessage(String host, Int port, String fieldlist, String channel, String header, String trailer, String mandatoryFields)—This function sends and receives a message based on the packager configured and the fieldlist used. The field list is a String that wrap the field names that will be sent in the message. The tokens are separated by a ';' character. Fields are named by the rule f<field ID>. If the name sent is an sub field name, the rule is f<field iD>s<sub ID>.

Example of a Field List:

f0;f2;f3;f28;f11;f34s0;f34s2s0;f34s2s2;f34s3;f34s5;f41; f70"

f34 is composed by f34s0, f34s2, f34s3 and f34s5, while f34s2 is composed by f34s2s0 and f34s2s2. Here we found three levels of inner fields.

The header and trailer to be sent in the message are hexadecimal strings representing the binary header and trailer that will be sent.

Example:

"0600030001" generates x06 x00 x03 x00 x01

The selected channel reflects the way the message length is stored in the message. The available channels are: "ASCII", "RAW", "NAC" and "NCC".

Example (Message Size is 256):

ASCII: x30 x32 x35 x36 ("0256")

RAW: x00 x00 x01 x00 (0000-0000 0000-0000 0000-0001 0000-0000)

NAC: x01 x00 (0000-0001 0000-0000)

NCC: x02 x56 (BCD)

The values for the fields sent in the fieldlist parameter, has to store values as variables in memory. You may set them with "WMLBrowser.setvar(fieldname, value);".

The message will be sent to the server and the script will block waiting for the response. If errors occur it will be retrieved as the function returning value, otherwise zero will be returned.

The response message is parsed by the packager rules. The fields and sub fields found will be saved into variables in memory too. The convention naming for that response variables are the same for the sending, but instead of a 'f' preceding the ID a 'r' will be the suffix.

The mandatoryFields argument is a String formatted as fieldlist is. It forces the response to be checked. If a mandatory field is missing an error occurs and the transaction is not processed.

From the moment the function returns and so on, the application has to recover the variables, verify them and do what is desired to do. Maybe print a receipt.

transactFromRecord(String host, Int port, Int storeId, Int recorded, String channel, String header, String trailer, String mandatoryFields)—This function sends and receives a message based on the packager configured and the ISO fields set. The fields are stored in a Record of a RecordStore. The RecordStore identification is passed as the storeId parameter and the Record identification is passed as recorded parameter. In order to build a record with the ISO fields, you should use the addRecordFromVars( ) function of the RecordStore library.

This function offers an alternative way to set arguments (in this case, the ISO fields) for a ISO transaction.

The header and trailer to be sent in the message are hexadecimal strings representing the binary header and trailer that will be sent.

Example:

"0600030001" generates x06 x00 x03 x00 x01

The selected channel reflects the way the message length is stored in the message. The available channels are: "ASCII", "RAW", "NAC" and "NCC".

Example (Message Size is 256):

ASCII: x30 x32 x35 x36 ("0256")

RAW: x00 x00 x01 x00 (0000-0000 0000-0000 0000-0001 0000-0000)

NAC: x01 x00 (0000-0001 0000-0000)

NCC: x02 x56 (BCD)

The mandatoryFields argument is a list of fields to be checked if present in the response.

Example of a mandatoryFields List:

"f0;f2;f3;f28;f11;f34s0;f34s2s0;f34s2s2;f34s3;f34s5;f41; f70"

f34 is composed by f34s0, f34s2, f34s3 and f34s5, while f34s2 is composed by f34s2s0 and f34s2s2. Here we found three levels of inner fields.

MandatoryFields forces the response to be checked. If a mandatory field is missing, an error occurs and the transaction is not processed.

The response message fields are stored in a new Record of the RecordStore and its id is the function returning value. To restore the fields in variables you should call the SetVarsFromRecord( ) function of the RecordStore library. The variables are set using the same nomenclature rule as transactMessage( ) does.

transactFromRecordToVar(String host, Int port, Int storeId, Int recordId, String channel, String header, String trailer, String mandatoryFields)—This function sends and receives a message based on the packager configured and the ISO fields set. The fields are stored in a Record of a RecordStore but the return is set to the WML Variable named ISORESP. If result length exceeds the WML maximum variables length (512), exceeding bytes are split into 500 bytes variables named ISORESPn, n=1 . . . WML Variable ISONRESP is also set with the total number of variables needed to store the result, including ISORESP. The RecordStore identification is passed as the storeId parameter and the Record identification is passed as recorded parameter. In order to build a record with the ISO fields, you should use the addRecordFromVars( ) function of the RecordStore library.

This function offers an alternative way to set arguments (in this case, the ISO fields) for an ISO transaction.

The header and trailer to be sent in the message are hexadecimal strings representing the binary header and trailer that will be sent.

Example:

"0600030001" generates x06 x00 x03 x00 x01

The selected channel reflects the way the message length is stored in the message. The available channels are: "ASCII", "RAW", "NAC" and "NCC".

Example (Message Size is 256):

ASCII: x30 x32 x35 x36 ("0256")

RAW: x00 x00 x01 x00 (0000-0000 0000-0000 0000-0001 0000-0000)

NAC: x01 x00 (0000-0001 0000-0000)

NCC: x02 x56 (BCD)

The mandatoryFields argument is a list of fields to be checked if present in the response.

Example of a mandatoryFields List:

"f0;f2;f3;f28;f11;f34s0;f34s2s0;f34s2s2;f34s3;f34s5;f41; f70"

f34 is composed by f34s0, f34s2, f34s3 and f34s5, while f34s2 is composed by f34s2s0 and f34s2s2. Here we found three levels of inner fields.

MandatoryFields forces the response to be checked. If a mandatory field is missing, an error occurs and the transaction is not processed.

The response message fields are stored in a new Record of the RecordStore and its id is the function returning value. To restore the fields in variables you should call the SetVarsFromRecord( ) function of the RecordStore library. The variables are set using the same nomenclature rule as transactMessage( ) does.

hexToInt(String hexa, Boolean BigEndian)—This function receives an hexadecimal representation of as Integer. The Integer in the script engine is four bytes long, so the hexa parameter can be a string of 2, 4, 6 or 8 character long, representing the Integer bytes. This representation can be as a "Big Endian" or "Little Endian", and this is informed in the in the Boolean parameter BigEndian (if working with a big endian representation, set it to true). The returning value is the desired Integer.

intToHex(Int i, Boolean BigEndian)—This function converts an integer into an hexadecimal representation of a Integer.

Additionally, the client system contains a library called PinPad that contains a set of functions used for accessing the PIN Pad device and the POS EMV Kernel through the EMV standard interface.

This invention is to be applied in a variety of business areas, such as healthcare services/insurance, loyalty, remote banking, bill payment, prepaid reload financial, gift card, money transfer, and age verification, time and labor management, among others.

The application herein described is an embodiment of the possibilities provided by the invention. Many different application modes can be designed, using different connection means even devices and network. The true scope of the invention is defined by the claims.

The invention claimed is:

1. An apparatus configured for supporting Web applications on a point-of-sale (POS) terminal and for connecting the POS terminal to a network using a plurality of communication protocols and transaction protocols, transaction protocols including at least HTTP, ISO8583 and XML operation, the apparatus comprising at least one processor and at least one memory including computer program code, the at least one memory and the computer program code configured to, with the processor, cause the apparatus to at least:

implement a web application development and runtime environment for developing applications for download and use on the POS terminal;

download, run, and update applications from application servers connected to the network using HTTP on top of TCP/IP;

enable one or more applications to use multiple communication protocols when connected to distinct access networks;

extend a web based runtime environment to perform electronic ISO8583 operations using POS peripheral devices, the web based runtime environment configured to support persistence of information and to prevent multi-application interference by supporting multi-applications independently carried out in logical distinct environments;

recognize, access, and control a plurality of POS peripheral devices, the POS peripheral devices comprising input and output peripheral devices;

connect a client system to a network to receive an address;

establish a transfer control protocol session between the client system and an application server;

send an application download/update request; and send, to the client system, the application pages, scripts and data files.

2. The apparatus according to claim 1, wherein the at least one memory and the computer program code are further configured to, with the processor, cause the apparatus to:

contact the transaction server with a message on a TCP/IP connection;

receive an answer from the transaction server with the client system configuration settings;

process the application settings to build a customized version of the web application; and send, to the client system, the customized application pages, scripts and data files.

3. The apparatus according to claim 1, wherein the connection of the POS terminal to the network is executed with a remote access server or via a broadband network.

4. The apparatus according to claim 1, wherein the address provided by the network is an Internet Protocol (IP) address.

5. The apparatus according to claim 1, wherein the at least one memory and the computer program code are further configured to, with the processor, cause the apparatus to:

send the application download/update request accompanied with an HTTP or HTTPS POST or GET command.

6. The apparatus according to claim 1, wherein the at least one memory and the computer program code are further configured to, with the processor, cause the apparatus to:

contact the transaction server via a message in ISO 8583 format.

7. The apparatus according to claim 1, wherein the at least one memory and the computer program code are further configured to, with the processor, cause the apparatus to:

subsequent to sending the application pages, scripts and data files:

process the files received; and emit a receipt of application download/updating completion.

8. The apparatus according to claim 1, wherein the at least one memory and the computer program code are further configured to, with the processor, cause the apparatus to:
connect the client system with a network to receive permission;
build a transaction message and sending such message to the transaction server; and
receive a response from transaction server to the client system with a transaction message.

9. The apparatus according to claim 8, wherein the connection of POS terminal to the network is executed with a remote access server or via a broadband network.

10. The apparatus according to claim 8, wherein the transaction message is in ISO 8583 format.

11. The apparatus according to claim 8, wherein the at least one memory and the computer program code are further configured to, with the processor, cause the apparatus to:
after receiving a response from the transaction server, process the messages received; and
emit a transaction receipt.

12. A computer program product configured for supporting Web applications on a point-of-sale (POS) terminal and for connecting the POS terminal to a network using a plurality of communication protocols and transaction protocols, transaction protocols including at least HTTP, ISO8583 and XML operation, the computer program product comprising at least one non-transitory computer-readable storage medium having computer-executable program code instructions stored therein, the computer-executable program code instructions comprising program code instructions for:
implementing a web application development and runtime environment for developing applications for download and use on the POS terminal;
downloading, run, and update applications from application servers connected to the network using HTTP on top of TCP/IP;
enabling one or more applications to use multiple communication protocols when connected to distinct access networks;
extending a web based runtime environment to perform electronic ISO8583 operations using POS peripheral devices, the web based runtime environment configured to support persistence of information and to prevent multi-application interference by supporting multi-applications independently carried out in logical distinct environments;
recognizing, access, and control a plurality of POS peripheral devices, the POS peripheral devices comprising input and output peripheral devices;
connecting a client system to a network to receive an address;
establishing a transfer control protocol session between the client system and an application server;
sending an application download/update request; and
sending, to the client system, the application pages, scripts and data files.

13. The computer program product according to claim 12, wherein the computer-executable program code instructions further comprise program code instructions for:
contact the transaction server with a message on a TCP/IP connection;
receive an answer from the transaction server with the client system configuration settings;
process the application settings to build a customized version of the web application; and
send, to the client system, the customized application pages, scripts and data files.

14. The computer program product according to claim 12, wherein the connection of the POS terminal to the network is executed with a remote access server or via a broadband network.

15. The computer program product according to claim 12, wherein the address provided by the network is an Internet Protocol (IP) address.

16. The computer program product according to claim 12, wherein the computer-executable program code instructions further comprise program code instructions for:
send the application download/update request accompanied with an HTTP or HTTPS POST or GET command.

17. The computer program product according to claim 12, wherein the computer-executable program code instructions further comprise program code instructions for:
contact the transaction server via a message in ISO 8583 format.

18. The computer program product according to claim 12, wherein the computer-executable program code instructions further comprise program code instructions for:
subsequent to sending the application pages, scripts and data files:
process the files received; and
emit a receipt of application download/updating completion.

19. The computer program product according to claim 12, wherein the computer-executable program code instructions further comprise program code instructions for:
connect the client system with a network to receive permission;
build a transaction message and sending such message to the transaction server; and
receive a response from transaction server to the client system with a transaction message.

20. The computer program product according to claim 19, wherein the connection of POS terminal to the network is executed with a remote access server or via a broadband network.

21. The computer program product according to claim 19, wherein the transaction message is in ISO 8583 format.

22. The computer program product according to claim 19, wherein the computer-executable program code instructions further comprise program code instructions for:
after receiving a response from the transaction server, process the messages received; and
emit a transaction receipt.

\* \* \* \* \*